US012792219B2

(12) United States Patent
Caprì et al.

(10) Patent No.: US 12,792,219 B2
(45) Date of Patent: Nov. 10, 2026

(54) FLEXIBLE SUB-CHANNEL SELECTION IN A SHARED COMMUNICATION CHANNEL

(71) Applicant: MICRON TECHNOLOGY, INC., Boise, ID (US)

(72) Inventors: Antonino Caprì, Bergamo (IT); Graziano Mirichigni, Vimercate (IT); Marco Sforzin, Cernusco sul Naviglio (IT); Bryan David Kerstetter, Kuna, ID (US); John David Porter, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 92 days.

(21) Appl. No.: 18/889,047

(22) Filed: Sep. 18, 2024

(65) Prior Publication Data

US 2025/0130718 A1 Apr. 24, 2025

Related U.S. Application Data

(60) Provisional application No. 63/545,439, filed on Oct. 24, 2023.

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0313; G06F 3/0659; G06F 3/0676
USPC .......................................................... 710/316
See application file for complete search history.

(56) References Cited

U.S. PATENT DOCUMENTS

2008/0222378 A1* 9/2008 Im ........................ G06F 13/1684 711/167
2017/0090804 A1* 3/2017 Bialas, Jr. ................ G11C 7/00
2022/0237139 A1* 7/2022 Richter ............... G06F 13/1668
2025/0068574 A1* 2/2025 Suh ........................ G06F 1/3225

* cited by examiner

*Primary Examiner* — Christopher B Shin
(74) *Attorney, Agent, or Firm* — Lowenstein Sandler LLP

(57) ABSTRACT

A system performs operations including: storing a first value in a first memory location used for selecting a sub-channel of a plurality of sub-channels in a communication channel, each of the plurality of sub-channels corresponding to one or more memory components of a plurality of memory components of the memory device, wherein the first value specifies that a sub-channel selecting function is enabled; receiving, through the communication channel, a command directed to the memory device; responsive to receiving the command, storing a second value in a second memory location, wherein the second value is obtained from the command; determining that the second value matches a third value stored in a third memory location, wherein the third value stored in the third memory location comprises a preset value corresponding to a first component of the plurality of components of the memory device; and executing, by the first component, the command.

20 Claims, 7 Drawing Sheets

310

| OP[7] | OP[6] | OP[5] | OP[4] | OP[3] | OP[2] | OP[1] | OP[0] |
|---|---|---|---|---|---|---|---|
| | | | | | Mode Selection | Mode Enablment | Mode Support |

315

| Function | Register Type | Operand | Data |
|---|---|---|---|
| Mode Selection | Read-only | OP[2] | $0_B$: Not Selected<br>$1_B$: Selected (Default) |
| Mode Enablement | R/W | OP[1] | $0_B$: Disabled (Default)<br>$1_B$: Enabled |
| Mode Support | Read-only | OP[0] | $0_B$: Not supported<br>$1_B$: Supported |

320

| OP[7] | OP[6] | OP[5] | OP[4] | OP[3] | OP[2] | OP[1] | OP[0] |
|---|---|---|---|---|---|---|---|
| CH Selection | | | | CH ID Number | | | |

325

| Function | Register Type | Operand | Data |
|---|---|---|---|
| CH Selection | Write-only | OP[7:4] | $0000_B$: 0<br>$0001_B$: 1<br>$0010_B$: 2<br>...<br>$1111_B$: 15 |
| CH ID Number | Read-only | OP[3:0] | $0000_B$: 0<br>$0001_B$: 1<br>$0010_B$: 2<br>...<br>$1111_B$: 15 |

FIG. 3

FLEXIBLE SUB-CHANNEL SELECTION IN A SHARED COMMUNICATION CHANNEL

RELATED APPLICATIONS

This application claims the benefit of U.S. Provisional Application No. 63/545,439, filed Oct. 24, 2023, which is incorporated herein by reference.

TECHNICAL FIELD

Embodiments of the disclosure relate generally to memory sub-systems, and more specifically, relate to flexible sub-channel selection in a shared communication channel.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 3 illustrates example registers for implementing flexible sub-channel selection in accordance with some embodiments of the present disclosure.

DETAILED DESCRIPTION

Figure 1:
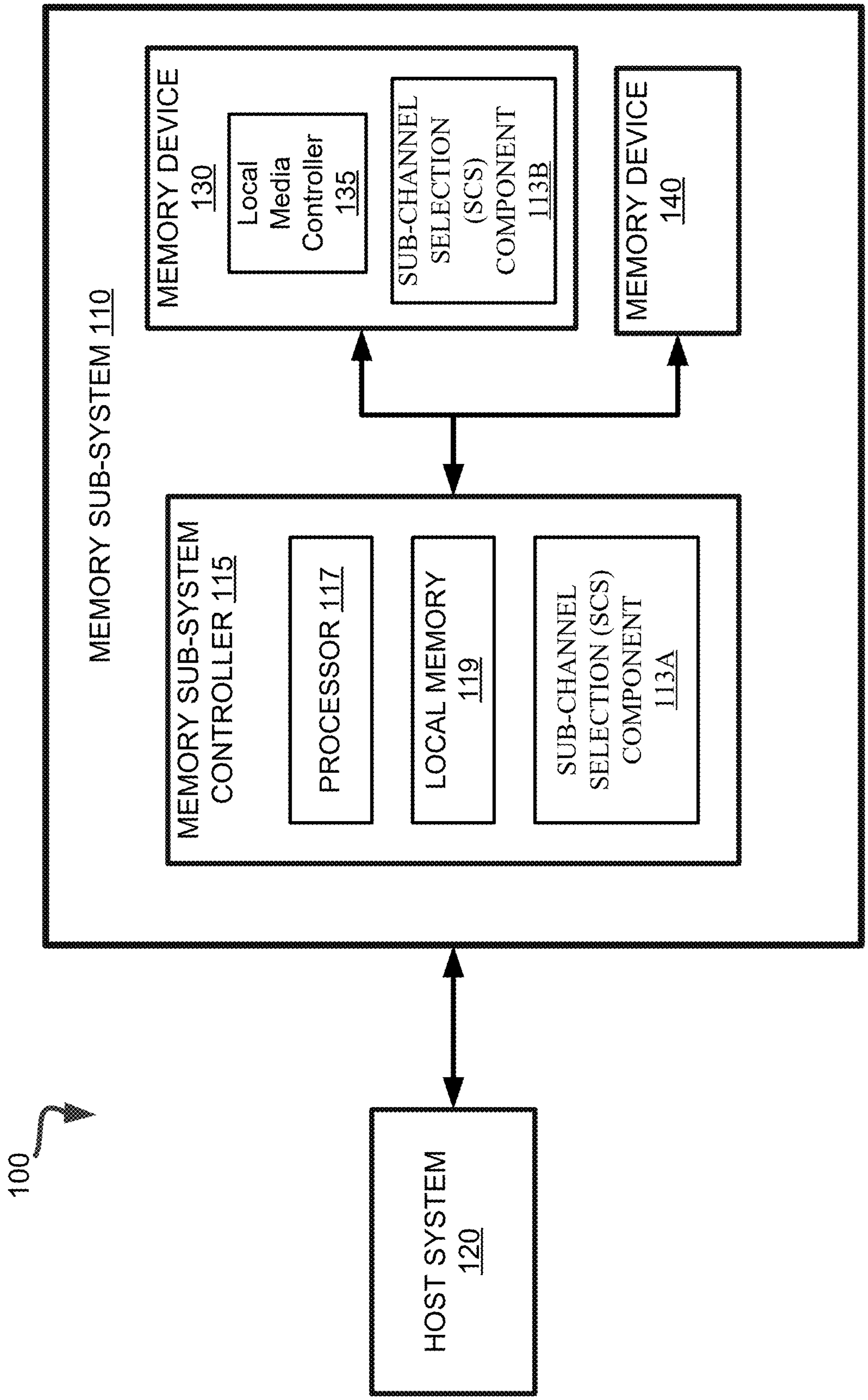
FIG. 1 illustrates an example computing system that includes a memory sub-system in accordance with some embodiments of the present disclosure.

Aspects of the present disclosure are directed to flexible sub-channel selection in a shared communication channel. A memory sub-system can be a storage device, a memory module, or a combination of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

A memory device can include multiple memory cells. Memory cells are formed onto a silicon wafer in an array of columns and rows. A memory device can further include conductive lines, referred to as wordlines and bitlines, connected to respective ones of the memory cells. The intersection of a bitline and a wordline constitutes the address of the memory cell. A block hereinafter refers to a unit of the memory device used to store data and can include a group of memory cells, a wordline group, a wordline, or individual memory cells. One or more blocks can be grouped together to form a bank of the memory device in order to allow concurrent operations to take place on each bank. The memory device can include circuitry that performs concurrent memory page accesses of two or more memory banks. For example, the memory device can include multiple access line driver circuits and power circuits that can be shared by the banks of the memory device to facilitate concurrent access of pages of two or more memory banks, including different page types. For ease of description, these circuits can be generally referred to as independent bank driver circuits. Depending on the storage architecture employed, data can be stored across the memory banks (i.e., in stripes). Accordingly, one request to read a segment of data (e.g., corresponding to one or more data addresses) can result in read operations performed on two or more of the memory banks of the memory device.

Memory commands, such as those sent by the host system, request the memory sub-system to perform memory access or other operations on the memory devices contained therein. Memory commands can generally be classified into respective categories, such as read commands, write commands, erase commands, move commands, etc. The memory commands may include commands triggering a hard post package repair, commands triggering a soft post package repair, mode register write commands, mode register read commands, commands altering memory device function or settings, etc. A memory sub-system controller can receive the memory commands from the host system connected externally to the memory sub-system. The memory sub-system can execute the memory commands to perform the memory access or other operations and can store the results of the memory commands for retrieval by the host system after the memory sub-system reports completion of the execution of the memory commands.

A memory component refers to at least a portion of a memory device. In certain implementations, the memory sub-system uses a single controller to drive multiple memory components via a shared communication channel. Multiple memory components can be multiple portions of a same memory device, multiple partitions each from different memory devices, or a combination thereof. This mechanism allows better performance, for example, large bandwidth. However, in some scenarios, the controller would send to multiple memory components sharing a communication channel, commands that are related to only one of those memory components. This is especially the case in a package post repair (PPR) process, where one memory component (e.g., one die) needs the repair, but the command for repairing is sent to multiple memory components sharing the communication channel. In such cases, multiple memory components sharing the communication channel may be unnecessarily repaired, which wastes repair resources. Another example is with the testing flow process, where one memory component (e.g., one die) needs the testing, but the command for testing is sent to multiple memory components sharing the communication channel.

Aspects of the present disclosure address the above and other deficiencies by implementing a sub-channel selection (SCS) component that allows selecting sub-channels of a communication channel shared by multiple memory components. "Memory component" refers to at least one portion (e.g., a set of memory cells, one or more pages, one or more blocks, one or more banks, or one or more dies, etc.) of a memory device. "Communication channel" refers to a logical connection, over a physical medium (e.g., a communication bus), used for information transfer of, for example, a digital bit stream, from one or several senders to several receivers (i.e., multiple memory components). A portion or entirety of the SCS component may reside in either the memory sub-system controller or a local controller in the memory device.

The sub-channel selection functionality would enable commands transmitted through the communication channel to be executed by a memory component corresponding to the selected sub-channel, rather than by multiple memory components sharing the communication channel. Specifically, the SCS component may utilize one or more registers on the memory component for selecting a sub-channel among a set of sub-channels of a communication channel, each of the set of sub-channels corresponding to a respective memory component of multiple memory components. "Register" refers to a portion (e.g., a unit) of memory allocated to store data.

A channel access method based on multiplexing can allow several data streams or signals to share the same communication channel, and a sub-channel in the communication channel refers to a logical connection, over a shared physical medium, used for information transfer from one or several senders to one receiver (i.e., one memory component). Each sub-channel in the communication channel can be identified by a sub-channel identifier, and thus, each sub-channels identifier corresponds to a respective memory component. The sub-channel identifier is programmed inside each memory component that is accessible via the sub-channel. In such cases, a specific memory component is assigned to a specific sub-channel as denoted by the programmed sub-channel identifier.

In some implementations, each memory component has two registers: a mode register and a sub-channel register. The two registers may work together to indicate whether the corresponding memory component is supported, enabled, and selected for the sub-channel selection feature. Specifically, the mode register may be employed to store three numeric values, referred to as a mode support parameter, a mode enablement parameter, and a mode selection parameter, which are utilized for supporting, enabling, and selecting a sub-channel selection feature of the respective memory component.

The mode support parameter is, e.g., a bit flag that indicates whether the memory component supports (i.e., is equipped with) the sub-channel selection feature. In some implementations, the value of the mode support parameter is preset during the manufacturing of the memory device, and the mode support parameter is readable during the operation of the memory device.

The mode enablement parameter is, e.g., a bit flag that indicates whether the sub-channel selection feature is enabled for the memory component. In some implementations, the SCS component can modify the value of the mode enablement parameter to enable or disable the sub-channel selection feature during the operation of the memory device. That is, the mode support parameter indicates whether a memory component is equipped, at the manufacturing stage, with a sub-channel selection feature, while the mode enablement parameter indicates whether the sub-channel selection feature is enabled in the memory component (that has been equipped with the sub-channel selection feature).

The mode selection parameter is used to indicate whether the memory component is selected for use with the sub-channel selection function. That is, the mode selection parameter indicates whether the memory component (that has been equipped and enabled with the sub-channel selection feature) is selected, among the memory components sharing the communication channel, to execute the command received through the shared communication channel, rather than ignoring the received command. In some implementations, the SCS component can set the value of the mode selection parameter as a default value representing that the corresponding memory component is selected. The SCS component can, after evaluating other values stored in the two registers as described in detail below, modify the value of the mode selection parameter to represent that the corresponding memory component is not selected.

The sub-channel register may be employed to store two numeric values, referred to as a sub-channel identifier and a sub-channel selection parameter, which are utilized for matching a sub-channel selection parameter with a sub-channel identifier to identify the selected sub-channel and the corresponding memory component.

The sub-channel identifier identifies the sub-channel assigned to the memory component. The sub-channel identifier of the memory component can be preset during the manufacturing of the memory device, representing the memory component corresponding to the sub-channel identifier, and the sub-channel identifier is readable during the operation of the memory device. In some implementations, each memory component is assigned to a unique sub-channel identifier. In some implementations, two or more memory components are assigned to a same sub-channel identifier, and in such case, the memory components with the same sub-channel identifier can be considered as a group regarding whether to execute or ignore the commands. In some implementations, the total number of the sub-channel identifier that can be assigned to the memory components is more than the total number of the memory components, and in such case, additional memory components may be added to support a flexibility in the number of the memory components.

The sub-channel selection parameter is used to identify the active (i.e., selected) sub-channel while the memory component has been equipped and enabled with the sub-channel selection feature. In such cases, memory components that are assigned to an active (i.e., selected) sub-channel will execute issued commands; memory components that are assigned to an inactive (i.e., unselected) sub-channel will ignore issued commands. In some implementations, a memory component may receive a command that specifies a specific sub-channel, and write the specific sub-channel information in the sub-channel selection parameter. The SCS component may compare the sub-channel selection parameter with the sub-channel identifier. Based upon this comparison, the mode selection parameter may be set.

In the case where the memory component has been equipped and enabled with the sub-channel selection feature, responsive to determining that the number stored in the sub-channel selection parameter matches the sub-channel identifier of the memory component, the SCS component of the memory component can set the mode selection parameter of the mode register of the memory component as a value indicating the sub-channel corresponding to the memory component is selected. By evaluating that the mode selection parameter has the value indicating the sub-channel is selected for the memory component, the mode support parameter indicates that the memory component has been equipped with the sub-channel selection feature, and the mode enablement parameter indicates that the sub-channel selection feature is enabled for the memory component, the SCS component of the memory component instructs the memory component to execute the command.

In the case where the memory component has been equipped and enabled with the sub-channel selection feature, responsive to determining that the number stored in the sub-channel selection parameter does not match the sub-channel identifier of the memory component, the SCS component of the memory component can set the mode selection parameter of the mode register of the memory component as a value indicating the sub-channel corresponding to the memory component is not selected. By evaluating that the mode selection parameter has the value indicating the sub-channel is not selected for the memory component, the mode support parameter indicates that the memory component has been equipped with the sub-channel selection feature, and the mode enablement parameter indicates that the sub-channel selection feature is enabled for the memory component, the SCS component of the memory component instructs the memory component to ignore the command. In some implementations, when two or more memory components has a same preset sub-channel identifier, these memory components can be instructed to execute or ignore a command as the same to each other. Since each memory component can independently determine whether to execute or ignore the command, the total number of sub-channels and the total number of the memory components do not affect the determination made by each memory component. As such, the total number of sub-channels may be more than, equal to, or less than the total number of the memory components.

In the case where the memory component has not been equipped or enabled with the sub-channel selection feature, the SCS component of the memory component may still set the mode selection parameter of the mode register of the memory component as a value indicating the sub-channel corresponding to the memory component is selected because, in such cases, all the memory components are selected, which means that the sub-channel selection feature is not in use.

As described above, by modifying the value(s) stored in the register(s), the local controller changes the operation from a standard mode to a sub-channel selection mode. In the standard mode, the memory sub-system controller sends a command to multiple or all memory components with the shared communication channel and each memory component will process the command. Conversely, in the sub-channel selection mode, the memory sub-system controller sends a command to multiple or all memory components with the shared communication channel and only the memory component(s) that is found to have the above-described match will execute the command, while other memory components will ignore the command. The sub-channel selection mode may be particularly useful for the testing flow and/or package post repair processes.

The SCS component of the memory component can also change the mode of operation from the sub-channel selection mode back to a standard mode by modifying the value(s) of the register(s). Specifically, the SCS component of the memory component can write the value of the mode enablement parameter to a predefined value (e.g., 0) disabling the sub-channel selection feature for the sub-channel. The flexibility of switching between the standard mode and the sub-channel selection mode provides a better control over the execution of the commands.

Advantages of this approach include improved performance of transmission of commands through a shared communication channel. By selecting a sub-channel in the shared communication channel, the system can efficiently execute the command directed to a memory component, avoiding wasting the resources used for executing the command by other memory components which the command should not be applied to. For example, in the PPR situation, the repair would only apply to the memory component which needs the repair, avoiding the resources waste for unnecessary repair. In addition, the flexibility of switching between the standard mode and the sub-channel selection mode enhances the management of execution of commands.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells, such as memory array. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or another suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controller 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In one embodiment, the memory device 130 can include a sub-channel selection (SCS) component 113B to perform the flexible sub-channel selection. In some implementations, the memory device 130 includes a first SCS register (also referred to as mode register) and a second SCS register (also referred to as sub-channel register). For example, the first SCS register and the second SCS register can be part of the SCS component 113B. In some implementations, the memory sub-system 110 includes sub-channel selection (SCS) component 113A that performs one or more functions of the sub-channel selection (SCS) component 113B. In some embodiments, the memory sub-system controller 115 includes at least a portion of the SCS component 113A. For example, the memory sub-system controller 115 can include a processor 117 (processing device) configured to execute instructions stored in local memory 119 for performing the operations described herein. In one embodiment, the SCS components 113A-B together perform the sub-channel selection. For example, responsive to memory sub-system controller 115 receiving one or more commands (e.g., read commands, write commands, erase commands, move commands, etc.) from a requestor, such as host system 120, the SCS components 113A-B can select a sub-channel, in a communication channel, corresponding the memory component among the memory components sharing the communication channel, and execute the commands received by the memory component corresponding to the selected sub-channel but ignore the commands received by other memory components. Further details with regards to the operations of SCS component 113A-B are described below with respect to FIGS. 2-6.

Figure 2:
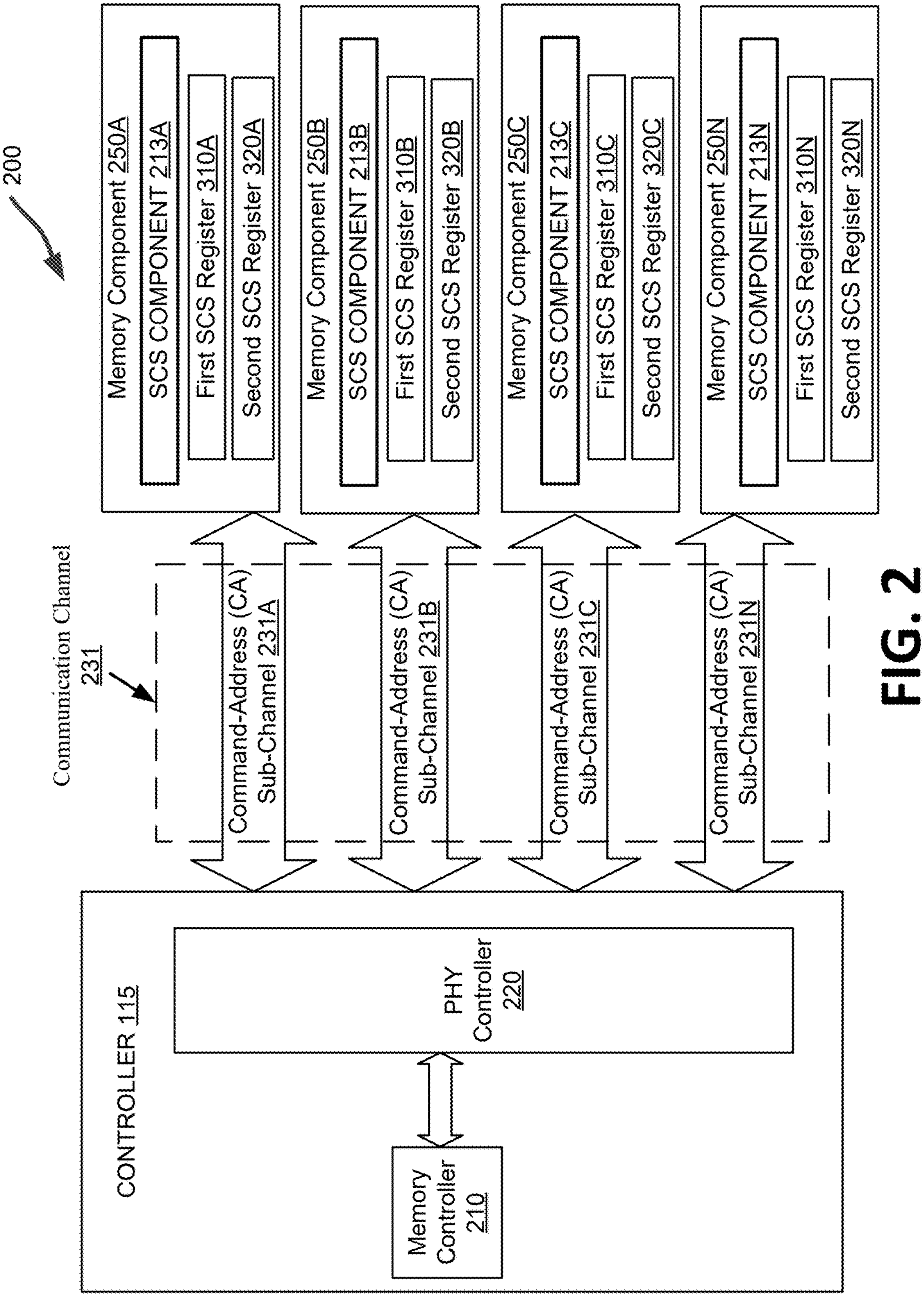
FIG. 2 illustrates an example system with flexible sub-channel selection feature in accordance with some embodiments of the present disclosure.

FIG. 2 illustrates an example system for implementing the sub-channel selection in accordance with some embodiments of the present disclosure. The system 200 includes a controller 115 and multiple memory (e.g., DRAM) components 250A-N. The controller 115 communicates with multiple memory components 250A-N via a shared communication channel (e.g., command-address (CA) channel 231). The controller 115 can include a memory controller 210 and a physical layer (PHY) controller 220. The memory controller 210, through a media access control (MAC) layer, can be connected with the physical layer (PHY) controller 220. The MAC layer can provide channel access control mechanisms for several receivers connected to the same physical medium to share it.

In some implementations, for example, the memory components 250A-N and the physical layer (PHY) controller 220 communicate with each other over an interface (e.g., high-speed very low swing-near ground (VLS-NG) signaling interface, which operates at speeds of up to 2 Gbps, using very low voltage swings in order to minimize power). The communication channel 231 may include multiple command-address (CA) sub-channels 231A-N. The CA sub-channel 231A-N is utilized to deliver command and address packets from the controller physical layer (PHY) 220 to the memory components 250A-N, respectively. The number of sub-channels in a communication channel implemented is dependent upon the quantity and width of the memory devices and the required communication bandwidth.

The memory components 250A-N may include a respective SCS component 213A-N. The memory components 250A-N may include a first SCS register 310A-N, respectively. The memory components 250A-N may include a second SCS register 320A-N, respectively. The details of the functionality of the SCS component and the configuration and usage of the first SCS register and the second SCS register will be described with examples shown in FIGS. 3, 4A and 4B.

FIG. 3 illustrates an example of the first SCS register and the second SCS register. The first SCS register 310 and the second SCS register 320 may be utilized for selecting a specific sub-channel to transmit commands to a memory component. As shown in FIG. 3, the first SCS register 310 can store 8 bits OP[0] to OP[7], where the last three bits OP[0], OP[1], OP[2] are used; the second SCS register 320 can store 8 bits OP[0] to OP[7], where all eight bits are used.

The table 315 illustrates example description of the first SCS register 310, including the function, the register type (e.g., read or write), the bit positions within the register, and the example data (e.g., the value of the operand) of each bit used in the first SCS register 310.

A bit space OP[0] of the first SCS register 310, which can be referred to as the mode support parameter ("mode support"), indicates whether a memory component of the memory device supports or does not support a sub-channel selection feature. OP[0] can be set to bit 0 or bit 1, where bit 0 means that the memory component does not support a sub-channel selection feature, and bit 1 means that the memory component supports a sub-channel selection feature. OP[0] can be set during the development and manufacturing of the memory device, and thus can be read-only. To simplify the description, OP[0] of the first SCS register 310 will be referred to as R1[0].

A bit space OP[1] of the first SCS register 310, which can be referred to as the mode enablement parameter ("mode enablement"), indicates that a sub-channel selection feature is enabled or disabled for a memory component of the memory device. OP[1] can be bit 0 or bit 1, where bit 0 means that a sub-channel selection feature of the memory component is disabled, and bit 1 means that a sub-channel selection feature of the memory component is enabled. In some implementations, the default configuration of OP[1] may be bit 0. OP[1] can be read or write. To simplify the description, OP[1] of the first SCS register 310 will be referred to as R1[1].

A bit space OP[2] of the first SCS register 310, which can be referred to as the mode selection parameter ("mode selection"), indicates whether or not the memory component is selected for the sub-channel selection feature. In such case, the commands transmitted using the shared communication channel will only be processed by the memory component(s) that correspond to the selected sub-channel. OP[2] can be bit 0 or bit 1, where bit 0 means that the memory component is not selected for the sub-channel selection feature, and bit 1 means that the memory component is selected for the sub-channel selection feature. In some implementations, the default configuration of OP[2] may be bit 1. OP[2] can be read-only. To simplify the description, OP[2] of the first SCS register 310 will be referred to as R1[2].

The table 325 illustrates example information of the second SCS register 320, including the function, the register type (e.g., read or write), the operand, and the example data (e.g., the value of the operand) of a range of storage spaces used in the second SCS register 320.

Four bit spaces OP[3:0] (i.e., OP[3], OP[2], OP[1], OP[0], and ":" means a range covering from its left item to its right item) of the second SCS register 320, which can be referred to as the sub-channel identifier ("CH ID number"), represents a sub-channel identifier number corresponding to a memory component of the memory device for each sub-channel of sub-channels for the sub-channel selection feature. In the example shown in FIG. 3, OP[3:0] can be one of bit [0000] to bit [1111], a total of sixteen values, where each bit value corresponds to a sub-channel identifier number that is associated with a memory component. For example, bit [0000] corresponds to sub-channel 0, bit [0001] corresponds to sub-channel 1, bit [0010] corresponds to sub-channel 2, . . . , and bit [1111] corresponds to sub-channel 15. In some implementation, OP[3:0] can be any value that corresponds to a sub-channel identifier number, where the sub-channel identifier number can be associated with one or more memory components. OP[3:0] can be set during the development and manufacturing of the memory device such that a memory component is associated with a sub-channel identifier number, and thus can be read-only. For example, the OP[3:0] can be programmed via one-time programmable fuses or different mechanisms according to the memory component position. To simplify the description, OP[3:0] of the second SCS register 320 will be referred to as R2[3:0].

Four bit spaces OP[7:4] (i.e., OP[7], OP[6], OP[5], OP[4]) of the second SCS register 320, which can be referred to as the sub-channel selection parameter ("CH selection"), represents a sub-channel identifier number that is selected for the sub-channel selection feature. In the example shown in FIG. 3, OP[7:4] can be one of bit [0000] to bit [1111], a total of sixteen values, where each bit value corresponds to a sub-channel identifier number that is selected. For example, bit [0000] corresponds to sub-channel 0, bit [0001] corresponds to sub-channel 1, bit [0010] corresponds to sub-channel 2, . . . , and bit [1111] corresponds to sub-channel 15. OP[7:4] can be write-only. OP[7:4] can be volatile, meaning that the value is not stored when power off. To simplify the description, OP[7:4] of the second SCS register 320 will be referred to as R2[7:4].

Although the first SCS register 310 and the second SCS register 320 described here each use 8 bits, other numbers of bits can be applicable, for example, based on the number of memory components connected to the sub-channels available for selection. For example, if 32 (i.e., $2^5$) sub-channels are available for selection, 10 bits (i.e., 5*2) can be used for each of the first SCS register 310 and the second SCS register 320. In some implementations, the number of bits of the first SCS register 310 and the second SCS register 320 can be different. In certain implementations, the SCS registers may contain mode register bits that do not pertain to SCS. For instance, the unused bits in first SCS register may be assigned to some other purpose that is unrelated to SCS. Furthermore, the parameters that provides the functions described above by the first and second SCS registers may be spread across any number of registers. In some embodiments, certain features may be added or excluded from the SCS registers. For this example, the usage of first SCS register 310 and the second SCS register 320 will be described below.

In one example, R1[0] is bit 0, meaning that the memory component does not support the sub-channel selection feature, and in such a case, the memory device would be operated under a normal situation in that all memory components in all sub-channels in the shared communication channel will execute the received commands. As such, R1[0] is bit 0 for each sub-channel, meaning each sub-channel will be selected, while the value of R1[1], R2[7:4], or R2[3:0] does not affect the result.

In another example, R1[0] is bit 1, meaning that the memory component supports the sub-channel selection feature. When the memory device is powered up, R1[2] and R1[1] each can be in a default value for each sub-channel, i.e., R1[2] is bit 1 for each sub-channel, meaning all sub-channels are selected, and R1[1] is bit 0 for each sub-channel, meaning the sub-channel selection feature is disabled for each sub-channel. In such a case, R2[3:0] for each sub-channel corresponds to a different memory component of the memory device, while the value of R2[7:4] does not affect the result. The other examples will be illustrated with respect to FIGS. 4A and 4B in detail.

Figure 4A:
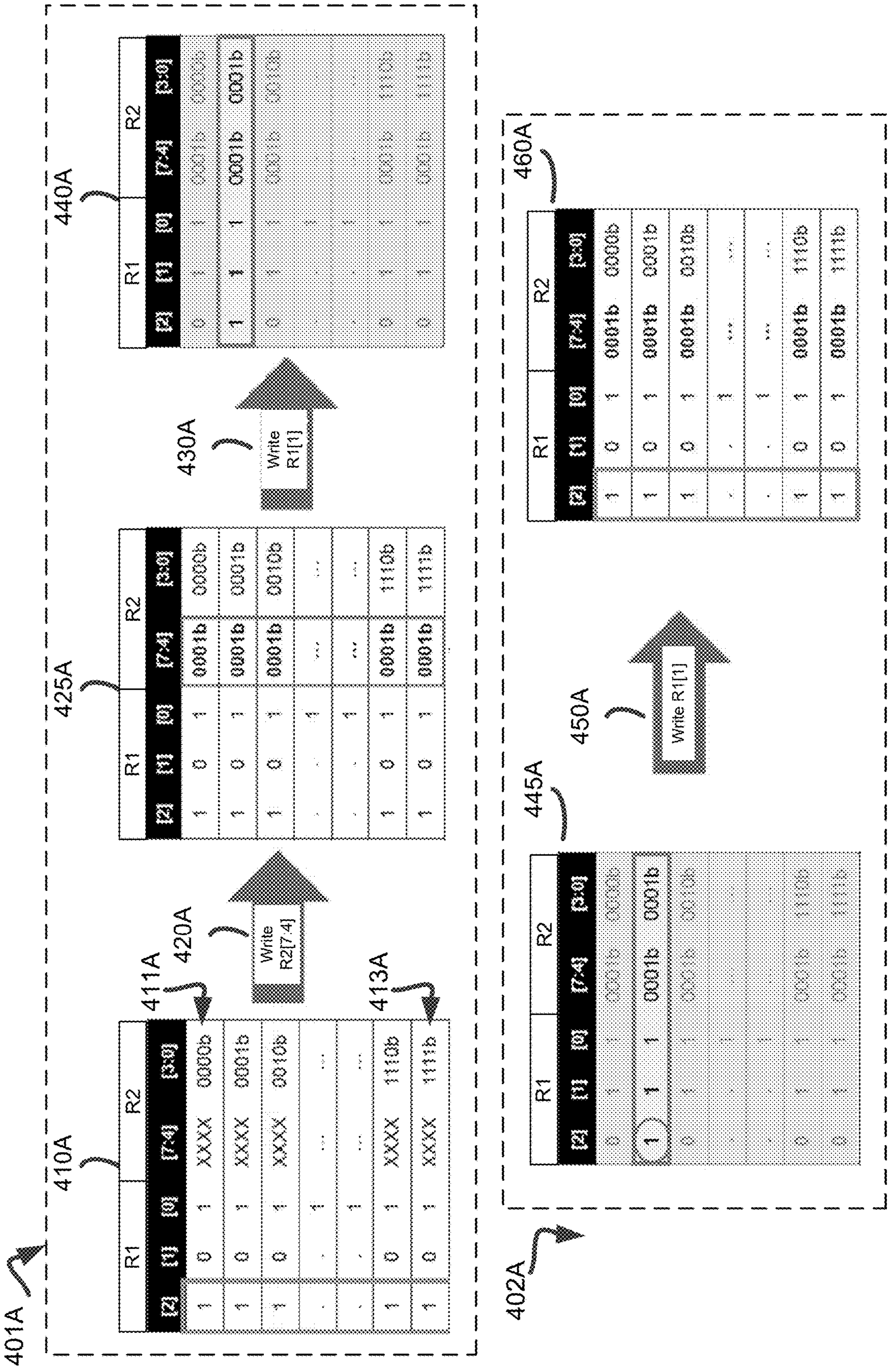
FIGS. 4A and 4B illustrate examples for implementing flexible sub-channel selection using registers illustrated in FIG. 3 in accordance with some embodiments of the present disclosure.
Figure 4B:
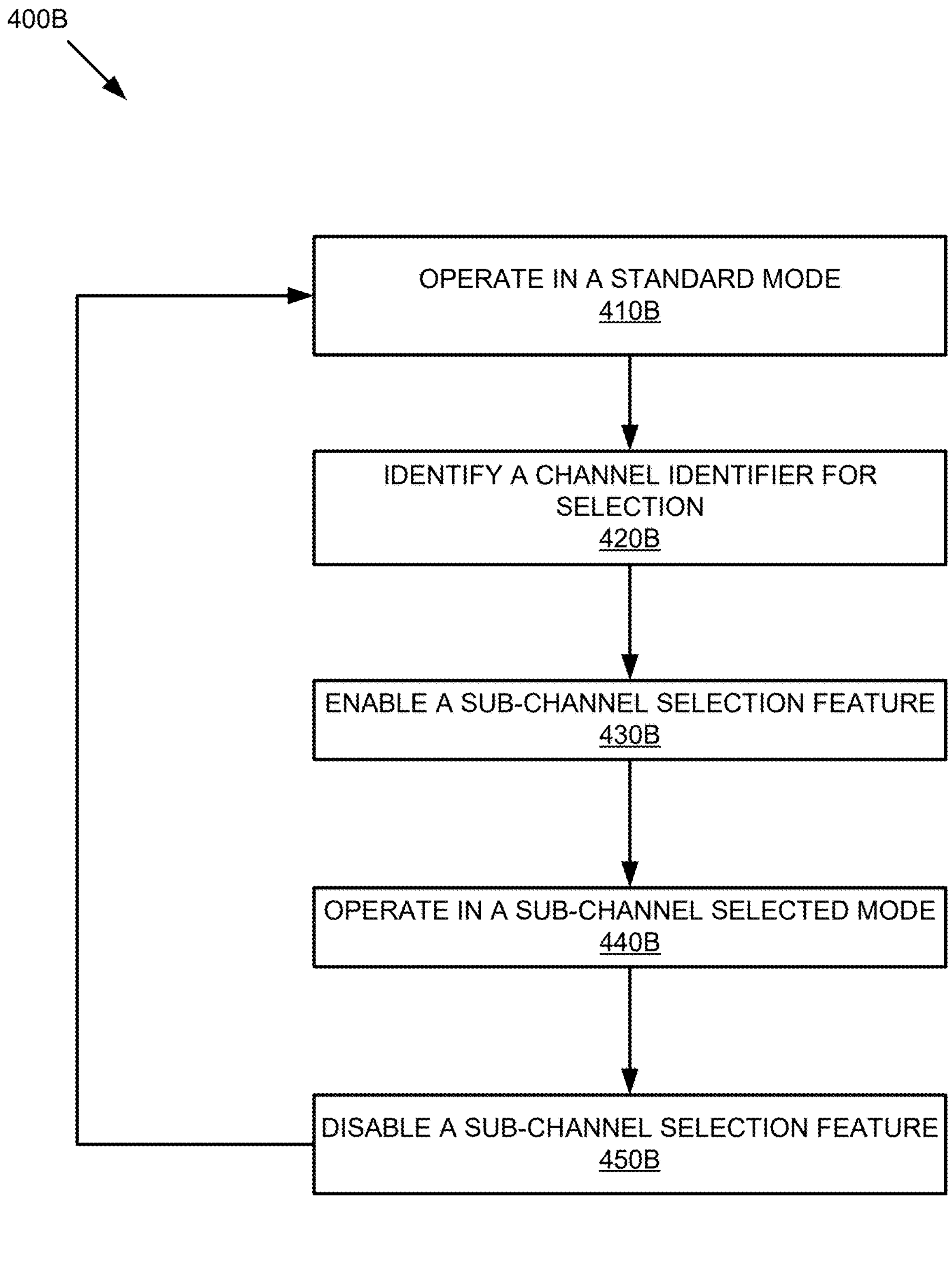

FIGS. 4A and 4B illustrates examples of using the SCS register to implement the sub-channel selection feature, specifically, by using the first SCS register 310 and the second SCS register 320 described with respect to FIG. 3. In FIG. 4A, the graph 401A illustrates a change from operations under a standard mode to operations under a sub-channel selection mode; the graph 402A illustrates a change from operations under a sub-channel selection mode to operations under the standard mode. FIG. 4B is a flow diagram of an example method corresponding to the operations illustrated with respect to FIG. 4A.

In FIG. 3 and FIGS. 4A and 4B, the first SCS register 310 ("R1") and the second SCS register 320 ("R2") are used for each of 16 sub-channels in a shared communication channel, and each sub-channel is connected with one of 16 memory components of the memory device, as indicated by R2[3:0]. In some embodiments, a sub-channel may be connected with multiple memory components (e.g., two memory components connected with each sub-channel) where R2[3:0] would be the same for each of these multiple memory components. In this case, the number of available sub-channels (e.g., 16) would be less than the number of memory components (e.g., 32). Yet, in other embodiments, not all available sub-channels may be connected with a memory component and some sub-channels can be left unused (e.g., each of eight sub-channels are connected to a memory component while the other eight sub-channels are not connected to any memory component). In this case, the number of available sub-channels (e.g., 16) would be greater than the number of memory components (e.g., 8). R1[0] is bit 1 for each sub-channel, meaning that the memory device supports the sub-channel selection feature. Since the values of R2[3:0] and R1[0] are preset during the development and manufacturing of the memory device, the values of R2[3:0] and R1[0] keep the same throughout all the operations described in FIGS. 4A and 4B.

The table 410A illustrates the status of R1 and R2 for 16 sub-channels, where each row corresponds to one of 16 sub-channels. Although the tables including R1 and R2 in FIG. 4A illustrate 16 sub-channels together, it should be noted that each row of the table can represent separate registers stored in a memory component. For example, the first row 411A of the table 410A may be registers stored in the memory component 250A (e.g., the first SCS register 310A and the second SCS register 320A), and the last row 413A of the table 410A may be registers stored in the memory component 250N (e.g., the first SCS register 310N and the second SCS register 320N). The table 410A may indicate the status of R1 and R2 in a power up situation described above. As shown in table 410A, R1[2] is bit 1 for each sub-channel, meaning all sub-channels are selected, and R1[1] is bit 0 for each sub-channel, meaning the sub-channel selection feature is disabled for each sub-channel. The value of R2[7:4] does not affect the result because the sub-channel selection feature is disabled. The table 410A corresponds to the operation 410B, where the controller operates the memory device at a standard mode.

As indicated by the graph 420A, the SCS component 113A-B writes [0001] bit in R2[7:4] for each sub-channel, which corresponds to the operation 420B, meaning a channel identifier for selection is identified. The table 425A illustrates the status of R1 and R2 for 16 sub-channels after the writing R2[7:4]. As indicated by the graph 430A, the SCS component 113A-B writes bit 1 in R1[1] for each sub-channel, which corresponds to the operation 430B, meaning the sub-channel selection feature is enabled for each sub-channel.

After the SCS component 113A-B enables the sub-channel selection feature for each sub-channel, the SCS component 113A-B determines whether the value of R2[7:4] matches the value of R2[3:0]. Responsive to determining that the value of R2[7:4] matches the value of R2[3:0], the SCS component 113A-B sets the value of R1[2] to bit 1 for the respective sub-channel with the matched values. Responsive to determining that the value of R2[7:4] does not match the value of R2[3:0], the SCS component 113A-B sets the value of R1[2] to bit 0 for the sub-channel. The table 440A illustrates the status of R1 and R2 for 16 sub-channels after writing R1[1] and the determination of match between R2[7:4] and R2[3:0]. The table 440A corresponds to the operation 440B, where the controller operates the memory device at a sub-channel selection mode. In the example table 440A, the memory sub-system controller sends a command to all memory components of all sub-channels in the shared communication channel, but only the memory component(s) having sub-channel identifier (i.e., R2[3:0]) preprogrammed to bit [0001] will execute the command. As such, commands may only be executed by the memory component(s) of a specific sub-channel.

Thereafter, the sub-channel selection mode may need to be changed back to the standard mode. As shown in the table 445A, which is the same as the table 440A, only one sub-channel has R1[2] in bit 1, while other sub-channels have R1[2] in bit 0, and R1[1] is bit 1 for each sub-channel. As indicated by the graph 450A, the SCS component 113A-B writes bit 0 in R1[1] for each sub-channel, which corresponds to the operation 450B, meaning the sub-channel selection feature is disabled for each sub-channel. Responsive to detecting bit 0 in R1[1], the SCS component 113A-B changes the value of R1[2] to bit 1 for each sub-channel, meaning all sub-channels are selected for their respective memory components to execute commands. The table 460A corresponds to the operation 410B, where the controller operates the memory device at a standard mode again.

The register(s) and its usage illustrated in FIGS. 3, 4A and 4B are only examples, and other registers, for example, in different number or format, can be used according to the characteristics and resources available, as long as the registers facilitate the functions that is needed to perform the flexible sub-channel selection described herein. For example, R1[2] may be omitted in some embodiments.

Figure 5:
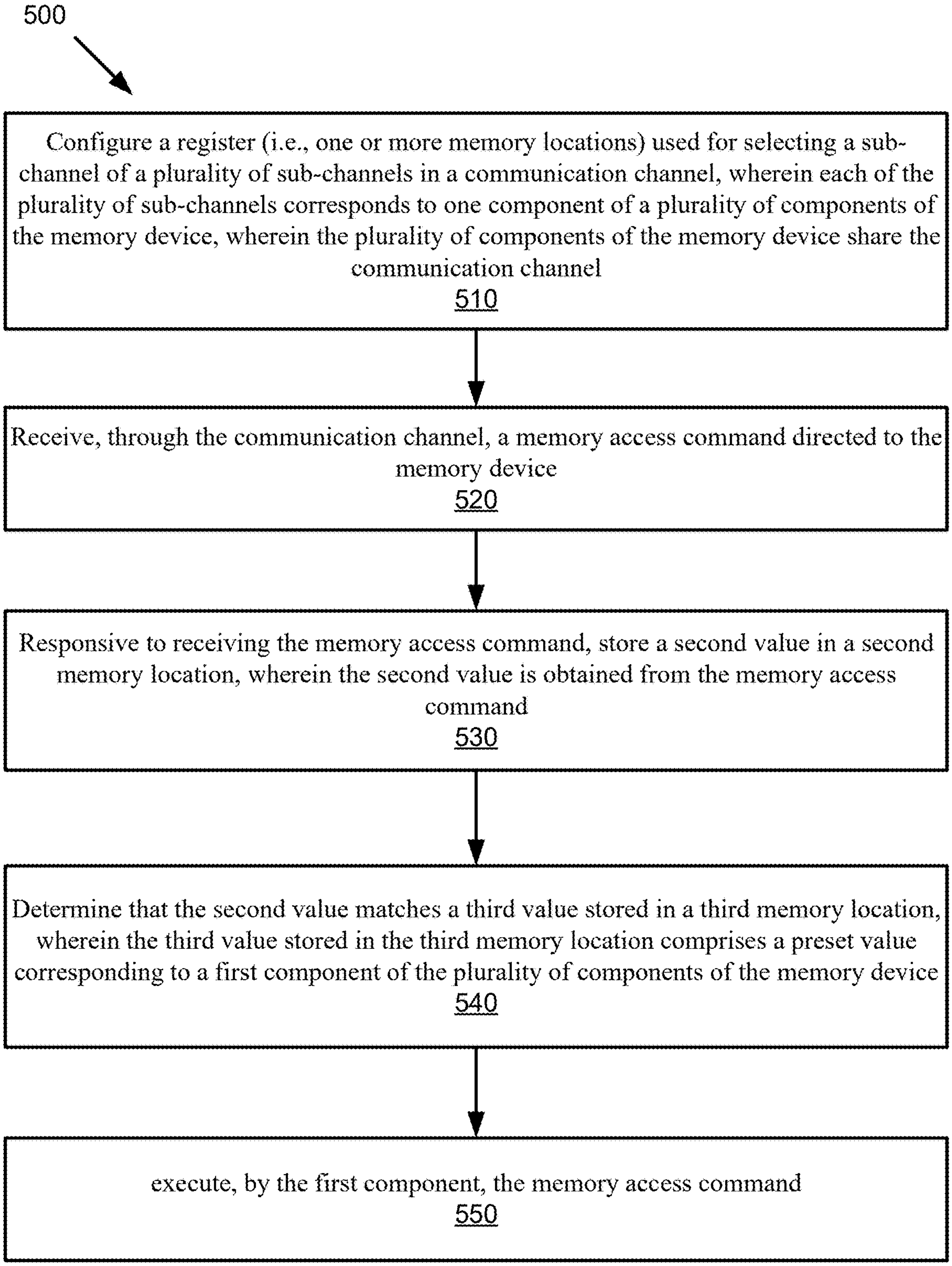
FIG. 5 is a flow diagram of an example method of flexible sub-channel selection in accordance with some embodiments of the present disclosure.

FIG. 5 is a flow diagram of an example method of implementing a sub-channel selection in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the SCS component 113A or SCS component 113B of FIG. 1 and the SCS component 213A-N of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic configures one or more registers (i.e., one or more memory locations) used for selecting a sub-channel of a plurality of sub-channels in a communication channel, where each of the plurality of sub-channels corresponds to one or more components of a plurality of components of the memory device, where the plurality of components of the memory device share the communication channel. In some implementations, the register(s) includes a first register and a second register, where the first register is used to store values of one or more parameters for enabling or disabling a sub-channel selection, and the second register is used to store values of one or more parameters for matching a sub-channel identifier with a selected sub-channel. In one example, the processing logic can write a bit value to the first register to enable or disable the sub-channel selection function. In one example, the processing logic can write a bit value to the second register to represent a sub-channel identifier for the selected sub-channel. In some implementations, one or more parameters of the register(s) are preset during the development and manufacturing of the memory device, for example, a parameter representing whether the memory device supports a sub-channel selection feature, or a parameter representing a sub-channel identifier associated with the memory component. In some implementations, the communication channel includes a CA channel.

In some implementations, the processing logic stores a first value in a first memory location (e.g., in a register) used for selecting a sub-channel of a plurality of sub-channels in a communication channel, where each of the plurality of sub-channels corresponds to one component of a plurality of components of the memory device, and the first value specifies that a sub-channel selecting function is enabled. In some implementations, the first value further specifies that the first component supports the sub-channel selecting function. In some implementations, the first value further specifies that the sub-channel selecting function is selected for the first sub-channel.

At operation 520, the processing logic receives, through the shared communication channel, a command directed to the memory device. In some implementations, commands are sent to all memory components sharing the communication channel, but only the selected memory component of the plurality of memory components would execute the command as described at operating 550. In other implementations, the processing logic determines whether the command is directed to one memory component of the plurality of memory components, instead of all memory components sharing the communication channel. In some implementations, the command may specify a first sub-channel identifier number (e.g., mode register write) or information that can be used to obtain a first sub-channel identifier number (e.g., mode register read).

At operation 530, responsive to receiving the command, the processing logic modifies a value stored in the register.

In some implementations, each sub-channel has its respective values stored in the register(s). By modifying the value(s) stored in the register(s), the processing logic can then determine a match of the modified value with a preset value stored in the register. That is, for the memory component that has been found a match, the processing logic changes the operation from a standard mode to a sub-channel selection mode for that memory component.

In some implementations, the processing logic, responsive to receiving the command, obtains, from the command, a first sub-channel identifier number, and stores a second value in a second memory location (e.g., in a register), where the second value is the same as the first sub-channel identifier number, and the first sub-channel identifier number is obtained from the command.

At operation 540, the processing logic determines whether the second value matches a third value stored in a third memory location (e.g., in a register), where the third value stored in the third memory location is a preset value corresponding to a first component of the plurality of components of the memory device. In some implementations, the processing logic determines that the second value matches the third value, and in response, the processing logic, at operating 450 may execute, by the first component, the command. In such situations, the processing logic may determine that the second value matches the third value but does not match the rest third values of a plurality of third values, where each third value of the plurality of third values identifies a respective sub-channel of the plurality of sub-channels, and where each third value of the plurality of third values is preset. The processing logic avoids executing the command by rest components of the plurality of components of the memory device except the first component. Such command may include a command for testing phase by selecting a single die and forcing idle state on the other dies, a command of selective post package repair on a product, or a command excluding a memory component from usage in case of continuous fails during the memory component's usage.

In some implementations, responsive to determining that the second value matches the third value of the plurality of third values, the processing logic modifies a fourth value stored in a fourth memory location (e.g., in a register), wherein the fourth value specifies the sub-channel selecting function is selected for the first component. In some implementations, the processing logic stores a fifth value in a fifth memory location (e.g., in a register), and where the fifth value specifies that the first component supports the sub-channel selecting function.

In some implementations, the processing logic modifies the first value stored in the first register to disable the sub-channel selecting function, and executing, by the plurality of components (instead of only by the first component), the command.

Figure 6:
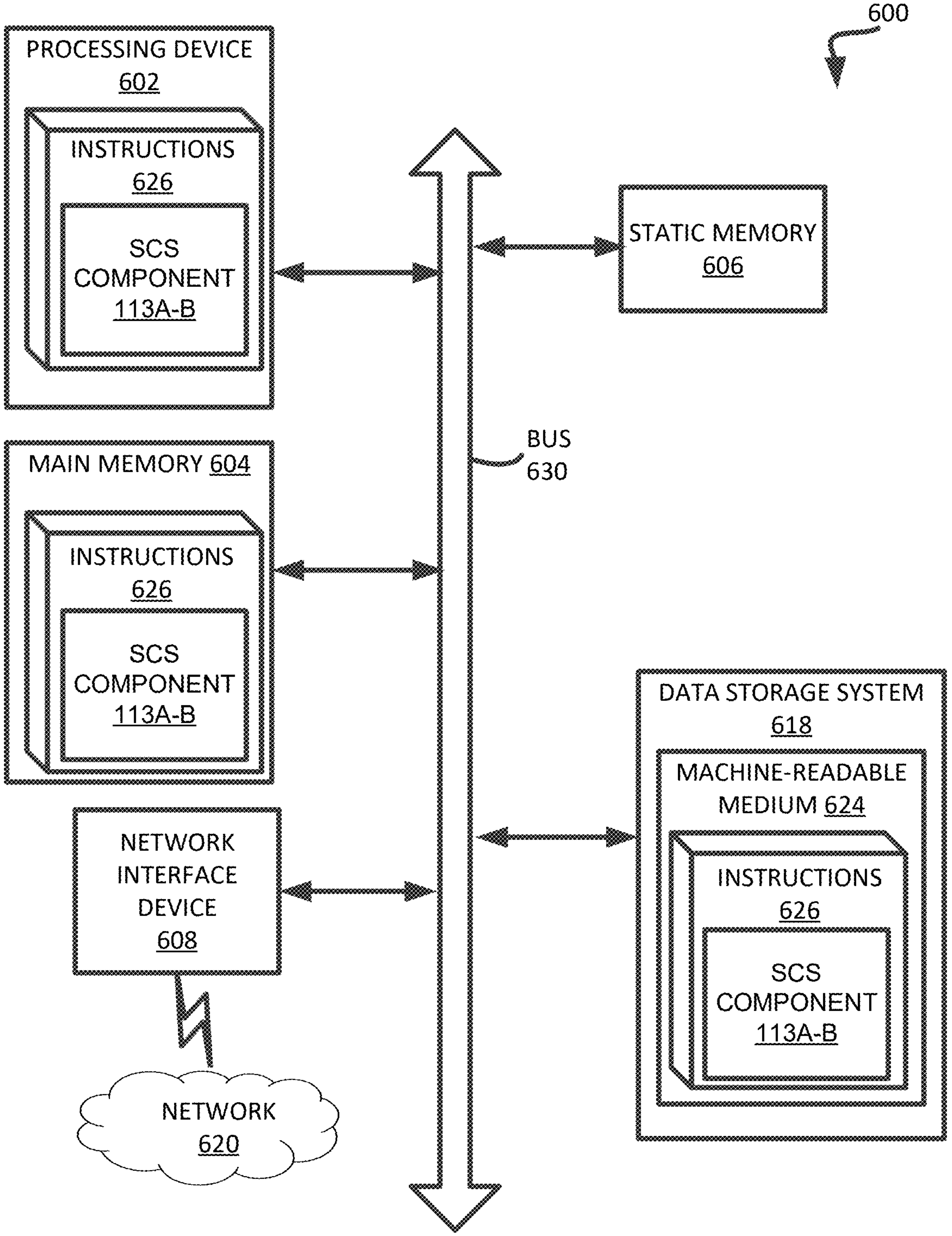
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the SCS component 113A-B of FIG. 1 and SCS component 213A-N of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the SCS component 113A-B of FIG. 1 and SCS component 213A-N of FIG. 2. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:

a plurality of memory components comprising a first memory component, wherein each memory component of the plurality of memory components comprises a first memory location reserved to store a value indicating whether a sub-channel selection function is enabled in a respective memory component, and a second memory location reserved to store a value indicating whether the sub-channel selection function is selected for the respective memory component, wherein the sub-channel selection function is used for selecting a sub-channel of a plurality of sub-channels of a communication channel, and wherein each of the plurality of sub-channels corresponds to one or more respective memory components of the plurality of memory components; and a processing device, operatively coupled to the plurality of memory components via the communication channel, to perform operations comprising:

determining that a first value, stored in the first memory location of the first memory component, indicates that the sub-channel selection function is enabled;

receiving a command directed to the memory device, wherein the command specifies a second value;

determining whether the second value matches a third value stored in a third memory location of the first memory component, wherein the third value specifies a preset value assigned to the first memory component;

responsive to determining that the second value matches the third value, storing, in the second memory location of the first memory component, a fourth value indicating that the sub-channel selection function is selected for the first memory component; and selectively executing, based on the first value and the fourth value, the command.

2. The memory device of claim 1, wherein each memory component of the plurality of memory components comprises a fourth memory location reserved to store a value specified in the command, and wherein the operations further comprise:

responsive to receiving the command, storing the second value in the fourth memory location of the first memory component, wherein the second value comprises a first identifier of a first sub-channel, of the plurality of sub-channels, corresponding to the first memory component.

3. The memory device of claim 1, wherein each memory component of the plurality of memory components comprises the third memory location reserved to store a respective preset value identifying a sub-channel, of the plurality of sub-channels, assigned to a respective memory component, wherein the operations further comprise:

determining whether the second value matches a plurality of third values each stored in the third memory location of the respective memory component.

4. The memory device of claim 3, wherein the operations further comprise:

responsive to determining that the second value does not match rest third values of the plurality of third values except the third value, setting each fourth value of rest fourth values of a plurality of fourth values to indicate that the sub-channel selection function is not selected for the respective memory component of the plurality of memory components;

avoid executing the command in rest memory components of the plurality of memory components except the first memory component.

5. The memory device of claim 1, wherein the first value is writable and readable, wherein the second value is writable, wherein the third value is readable, and wherein the fourth value is readable.

6. The memory device of claim 1, wherein the operations further comprise:

storing a fifth value in a fifth memory location of the first memory component, wherein the fifth value specifies that the first memory component supports the sub-channel selection function, and wherein the fifth value is readable.

7. The memory device of claim 1, wherein the operations further comprise:

modifying the first value stored in the first memory location to disable the sub-channel selection function; and executing, in the plurality of memory components, the command.

8. A method comprising:

determining that, by a processing device, a first value, stored in a first memory location of a first memory component of a plurality of memory components of a memory device, indicates that a sub-channel selection function is enabled, wherein each memory component of the plurality of memory components comprises the first memory location reserved to store a value indicating whether the sub-channel selection function is enabled in a respective memory component, and a second memory location reserved to store a value indicating whether the sub-channel selection function is selected for the respective memory component, wherein the sub-channel selection function is used for selecting a sub-channel of a plurality of sub-channels of a communication channel, and wherein each of the plurality of sub-channels corresponds to one or more respective memory components of the plurality of memory components;

receiving a command directed to the memory device, wherein the command specifies a second value;

determining whether the second value matches a third value stored in a third memory location of the first memory component, wherein the third value specifies a preset value assigned to the first memory component;

responsive to determining that the second value matches the third value, storing, in the second memory location of the first memory component, a fourth value indicating that the sub-channel selection function is selected for the first memory component; and selectively executing, based on the first value and the fourth value, the command.

9. The method of claim 8, wherein each memory component of the plurality of memory components comprises a fourth memory location reserved to store a value specified in the command, and further comprising:

responsive to receiving the command, storing the second value in the fourth memory location of the first memory component, wherein the second value comprises a first identifier of a first sub-channel, of the plurality of sub-channels, corresponding to the first memory component.

10. The method of claim 8, wherein each memory component of the plurality of memory components comprises the third memory location reserved to store a respective preset value identifying a sub-channel, of the plurality of sub-channels, assigned to a respective memory component, and further comprising:

determining whether the second value matches a plurality of third values each stored in the third memory location of the respective memory component.

11. The method of claim 10, further comprising:

responsive to determining that the second value does not match rest third values of the plurality of third values except the third value, setting each fourth value of rest fourth values of a plurality of fourth values to indicate that the sub-channel selection function is not selected for the respective memory component of the plurality of memory components;

avoid executing the command by in rest memory components of the plurality of memory components except the first memory component.

12. The method of claim 8, wherein the first value is writable and readable, wherein the second value is writable, wherein the third value is readable, and wherein the fourth value is readable.

13. The method of claim 8, further comprising:

storing a fifth value in a fifth memory location of the first memory component, wherein the fifth value specifies that the first memory component supports the sub-channel selection function, and wherein the fifth value is readable.

14. The method of claim 8, further comprising:

modifying the first value stored in the first memory location to disable the sub-channel selection function; and executing, in the plurality of memory components, the command.

15. A non-transitory computer readable storage medium comprising instructions, which when executed by a processing device, cause the processing device to perform operations comprising:

determining that a first value, stored in a first memory location of a first memory component of a plurality of memory components of a memory device, indicates that a sub-channel selection function is enabled, wherein each memory component of the plurality of memory components comprises the first memory location reserved to store a value indicating whether the sub-channel selection function is enabled in a respective memory component, and a second memory location reserved to store a value indicating whether the sub-channel selection function is selected for the respective memory component, wherein the sub-channel selection function is used for selecting a sub-channel of a plurality of sub-channels of a communication channel, and wherein each of the plurality of sub-channels corresponds to one or more respective memory components of the plurality of memory components;

receiving a command directed to the memory device, wherein the command specifies a second value;

determining whether the second value matches a third value stored in a third memory location of the first memory component, wherein the third value specifies a preset value assigned to the first memory component;

responsive to determining that the second value matches the third value, storing, in the second memory location of the first memory component, a fourth value indicating that the sub-channel selection function is selected for the first memory component; and selectively executing, based on the first value and the fourth value, the command.

16. The non-transitory computer readable storage medium of claim 15, wherein each memory component of the plurality of memory components comprises a fourth memory location reserved to store a value specified in the command, and further comprising:

responsive to receiving the command, storing the second value in the fourth memory location of the first memory component, wherein the second value comprises a first identifier of a first sub-channel, of the plurality of sub-channels, corresponding to the first memory component.

17. The non-transitory computer readable storage medium of claim 15, wherein each memory component of the plurality of memory components comprises the third memory location reserved to store a respective preset value identifying a sub-channel, of the plurality of sub-channels, assigned to a respective memory component, and wherein the operations further comprise:

determining whether the second value matches the third value of a plurality of third values each stored in the third memory location of the respective memory component.

18. The non-transitory computer readable storage medium of claim 17, the operations further comprise:

responsive to determining that the second value does not match rest third values of the plurality of third values except the third value, setting each fourth value of rest fourth values of a plurality of fourth values to indicate that the sub-channel selection function is not selected for the respective memory component of the plurality of memory components;

avoid executing the command in rest memory components of the plurality of memory components except the first memory component.

19. The non-transitory computer readable storage medium of claim 15, wherein the first value is writable and readable, wherein the second value is writable, wherein the third value is readable, and wherein the fourth value is readable.

20. The non-transitory computer readable storage medium of claim 15, wherein the operations further comprise:

storing a fifth value in a fifth memory location of the first memory component, wherein the fifth value specifies that the first memory component supports the sub-channel selection function, and wherein the fifth value is readable.

* * * * *